UNITED STATES PATENT OFFICE.

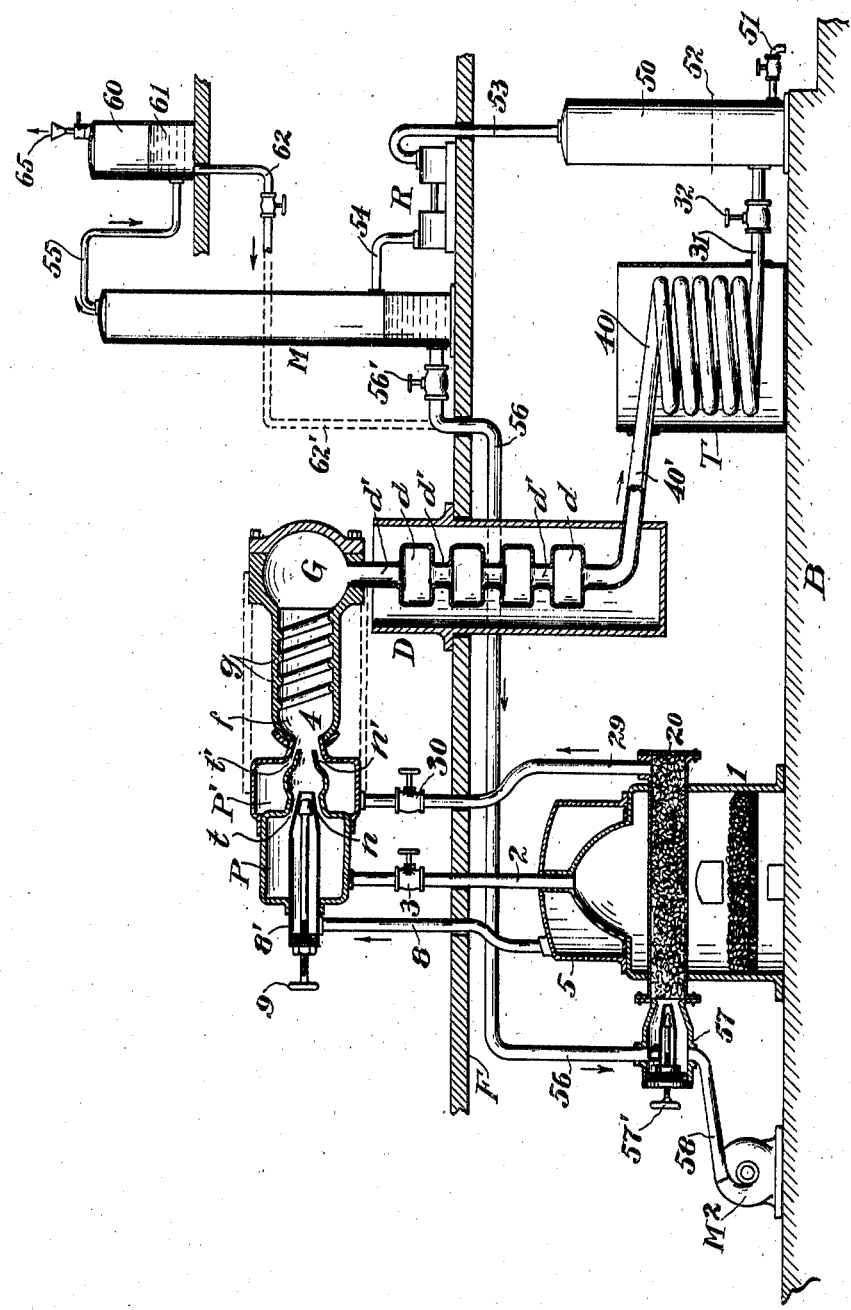

EDWIN D. CHAPLIN, OF NEW YORK, N. Y.

SULFURIC-ACID MANUFACTURE.

1,325,712.     Specification of Letters Patent.     Patented Dec. 23, 1919.

Application filed March 10, 1916. Serial No. 83,218.

*To all whom it may concern:*

Be it known that I, EDWIN D. CHAPLIN, a citizen of the United States, residing in New York, in the county of New York and State of New York, have invented certain new and useful Improvements in Sulfuric-Acid Manufacture, of which the following is a specification.

This invention relates more especially to the manufacture of sulfuric acid ($H_2SO_4$) in conjunction with sulfur trioxid ($SO_3$), for thereby producing the commercial product commonly designated as "fuming acid," which may be said to consist of sulfur trioxid dissolved in sulfuric acid. A principal object of my present invention is to furnish an improved process for the continuous and economical production of the "fuming" grade of acid by the aid of a primary process in which and whereby a given quantity of chlorin is continuously employed in a closed circuit, for directly coöperating with other materials and products in successive stages of the respective processes, as hereinafter more fully explained.

The leading features of the principal process whereby the several supplies of acid-forming materials, or ingredients, are assembled and incorporated, and subjected to acid-forming reactions in the "combining chamber," are only incidentally described and are not broadly claimed herein, since those process improvements are more fully set forth in, and constitute in part the subject-matter of my copending application Serial No. 74,530, filed Jan. 27, 1916, to which reference may be had.

For the purposes of this specification, the so called fuming grades of sulfuric acid products are herein regarded as being composed of a quantity of sulfur trioxid ($SO_3$) which is in a state of combination with water, ($H_2O$), while this combination has dissolved therein a further quantity (in the nature of an excess) of the sulfur trioxid. This view appears to be consistent with the recognized phenomenon that when such a sulfur compound is exposed to the atmosphere at ordinary temperatures, sulfur trioxid is lost by a kind of evaporation which ultimately reduces the compound from the formula $H_2SO_4 + SO_3$ to the formula $H_2SO_4$. In some instances, however, this transformation may proceed in two ways at the same time,—first by such an evaporation of the said excess, or uncombined, sulfur trioxid, and second, by a concurrent absorption of "water," $H_2O$, from the atmosphere. In this or some analogous manner, some part of said excess $SO_3$ will be converted gradually into $H_2SO_4$, which is well-known to be a stable compound at ordinary low temperatures. When by such reductions, the said excess $SO_3$ has been entirely disposed of, the remaining compound is designated as "100% sulfuric acid," and this on further exposure to moisture will gradually become more and more dilute by absorption of an excess quantity of water, which, perhaps, may not be in a state of combination with the sulfur trioxid; but this question is not deemed to be a material one as regards the present invention and application.

In the accompanying drawings, the figure diagrammatically illustrates,—partly in vertical section,—an arrangement of apparatus adapted for carrying out my improved processes.

As in illustration of the manner in which the acid plant may be installed in a building, some portions of the apparatus are shown set upon a floor, as B, which in practice is preferably a concrete floor in the lower story of a building which also has an upper floor, as F, upon which other portions of the apparatus may be arranged conveniently for access and supervision by the operators. The apparatus may, in practice, be supplied with pressure gages (not shown) applied in a well-known manner, whereby the attendants may observe the pressures within the several pipes and other members throughout the plant, and thus be enabled to more readily regulate the several supply-controlling valves, and other details. The hereindescribed improvements in the apparatus, however, are not claimed herein, but so far as they are of my invention will constitute in part the subject-matter of separate copending applications.

Referring to the drawing, this shows the pipe 8 for conducting steam,—preferably somewhat superheated and dry,—from some suitable boiler, as 5, to a tube or ejector member, 8', which terminates in a nozzle $n$, and is provided with a regulating valve, 9, whereby the steam may be released from a higher pressure in the member 8' to a lower pressure within the more forward nozzle, $n'$, which communicates with the chamber P through the annular conduit, or throat at $t$. A similar supply-chamber P', surrounds the nozzle n', and communicates through the annular conduit t', with the principal combining space, 4, which is inclosed within the wall f. Thus the apparatus which is herein shown is provided with two ejector nozzles operating in series with one steam jet.

One of the principal parts of the apparatus illustrated in the drawing, consists of the combining apparatus shown in position above the floor F. This apparatus in the form thereof herein shown, is in certain respects and details, in the nature of an improvement on the similar apparatus which is shown in my copending application, Serial No. 74530, filed Jan. 27, 1916, to which reference may be had. In the present apparatus, however, the details are so arranged as to mix the several materials in an improved manner, but nevertheless, in some instances if desired, the less complex form of combining apparatus shown in said application No. 74530, may be substituted for the purposes of my present processes, for the particular form of said apparatus herein shown.

The chamber P is shown connected by the pipe 2 and through a supply-regulating valve 3, with the interior of a sulfur-burner at 1, and the chamber P' is similarly connected through a pipe, 29, (having a supply-regulating valve, 30), with one end of an acid-dissociating retort 20, which may be arranged,—as herein indicated,—in a position for being heated by the combustion of the sulfur within the burner 1. The steam boiler, 5, may also be arranged for operation by the heat from the sulfur-burner either by placing the boiler over said burner (as shown in the drawing), or by some other suitable arrangement,—not herein shown. Through the pipe 8, steam is supplied to the combining apparatus; through the pipe 2, sulfur dioxid and a carrier gas ($SO_2$ and N) are supplied to the chamber P; the pipe 29 supplies to the chamber P' from the apparatus 20, chlorin, hydrogen, oxygen and nitrogen, probably related thus: Cl and $H_2O$, (water vapor) and N. The pipes 2 and 29, therefore, supply nitrogen to the chambers P and P', respectively, for use as a diluent, or as a neutral carrier gas, during and subsequent to the reaction period, in the combining space 4 and beyond, in the circuit of the apparatus.

In the present arrangement of the apparatus, the sulfur-dioxid is first mixed or incorporated by (or at) the nozzle n, and these materials (with some nitrogen) form a jet-stream which issues through the nozzle n', for combining with the chlorin and associated substances supplied (as already mentioned) into the principal reaction tube or chamber, at 4. This specific process of the said successive incorporations of the said substance in the way and manner here set forth is not broadly claimed herein, since it is intended to form the subject matter of a separate application.

The combining chamber, 4, is herein indicated as being of a tubular form, but of a relatively short length and terminating in a larger chamber G, preferably nearly globular in form and arranged for acting as a mixing chamber. The chamber 4 is also shown provided on the interior thereof with spiral (or helical) ribs, g, arranged for imparting to the outer portion of the jet-stream of gases, a whirling movement as they enter the space G, and thereby promote a violent mechanical agitation and intermixing of all the gases while the acid-forming ingredients are still undergoing the normal reactions in the rapidly expanding steam and before the complete dissociation thereof.

From the mixing-space G, the gases, in this instance, are led off (transversely to the combining space 4), to a cooling coil, as 40, within a water-tank, T, and terminating in the pipe 31, through which the materials pass to subsequent stages of the cycle of operations or steps, comprised in the processes. This cooling apparatus,—or such other suitable apparatus as may be substituted for the particular form and arrangement here indicated,—may be made of such size and proportions as may be found desirable for effectively coöperating with the other portions of the plant.

When the quantities of materials passing through the reaction-spaces 4 and G, are relatively large, naturally some residual quantities of uncombined acid-forming ingredients may pass out of the space G, mixed with a large proportion of the neutral or non-combining carrier-gas, and for dealing more effectively with such residual quantities, I have herein indicated a secondary mixing apparatus located intermediate to the aforesaid combining apparatus and the cooling apparatus at T. This secondary apparatus may be arranged in a horizontal manner, (not shown), but the vertically-disposed arrangement herein illustrated at D, is deemed to be the preferable one. Within the tank D, a series of chambers, d, d, of any suitable or required size and proportions are shown arranged with short connecting pipes d' of a relatively small diameter. In passing from the combining-space, (whether this be the space G, or otherwise), the gases pass through the uppermost of the pipes d' into the uppermost space d, and in an analogous manner pass through the remaining said pipes and spaces to the pipe 40' of the coil 40. In thus progressing through the apparatus at D, the gases are alternately subjected to high velocity in a contracted stream through the pipes d', and then the stream is expanded and further intermixed in the spaces $d$, thereby producing a very complete incorporation of the constantly decreasing volume of the acid-forming ingredients which are mingled with the carrier gas.

The product materials, including the condensed liquids and the gases, pass from the cooling apparatus T, through the pipe 31 and valve 32 into a collection chamber, 50, from which the liquids may be drawn off from time to time by the discharge pipe and valve at 51. The line 52 may be considered as a normal liquid-level within the tank or reservoir 50, in which the space above said line serves as a gas-holder for the hydrochloric acid gas, and also for the carrier-gas. In the present instance, the accumulated gases pass from the holder 50 through pipe 53 to a liquefying compressor R, (which may be of any suitable and well-known construction), in which the hydrochloric acid gas becomes compressed into a liquid, and is thence discharged through the pipe 54 into the relatively tall reservoir column M for a gravitational separation of the hydrochloric fluids and vapors from the carrier-gas, this consisting mainly of nitrogen.

For separating and disposing of the said carrier-gas, a supplemental apparatus may be conveniently arranged as follows: A pipe, 55, leading from the top of column M, enters the bottom of the tank 60 in which a body of water, 61, may be supplied,—preferably by or from a pressure-supply (not shown),—in a well-known manner. Thus the nitrogen or other neutral carrier-gas from pipe 55 is "washed" of its absorbed acid vapors by the water 61, which thereby takes up a large portion of such vapors and gradually becomes aqueous hydrochloric acid; when of a desired strength, this acid may be drawn off from time to time through the pipe 62 and more water supplied to the tank 60. The gases entering the reservoir 60 and not absorbed by the bath or water 61, may be automatically discharged by means of a pressure-controlled relief-valve, as 65, which should, in practice, be adjusted for automatic operation whenever the gas-pressure within the tank 60 and column M rises to a suitable predetermined amount.

For supplying the hydrochloric material from the apparatus M to the apparatus at 20, a pipe 56 is shown leading to a valved-nozzle device, 57, which also connects by a pipe 58 with some suitable air-supplying pump indicated at M². A valve, 57′, may be arranged for regulating the admission of the hydrochloric acid, (preferably in the form of a liquid, as herein indicated) from the pipe 56 to the retort H, and for there mixing such fluid in a spray with the air from said air-supply pump. The air thus supplied furnishes the oxygen which aided by the furnace heat dissociates the hydrogen from the chlorin. The pipe 56 may have a valve, as 56′ and the pipe 62 may be continued as a pipe at 62′ whereby the aqueous acid from tank 60 may be slowly supplied to said pipe 56 preferably at some point beyond the valve 56′.

On the dissociation of the combined chlorin and hydrogen, the latter temporarily joins with oxygen supplied by the air so that, as I now apprehend, the freed chlorin is protected, (during the passage thereof through the conduit 29); against recombining until it reaches the reaction chamber 4. Also it appears that the same oxygen which is thus taken from the air is held in a combination, $H_2O$, ready for being released in the required "nascent state," when this $H_2O$ shall be dissociated for utilizing the oxygen in oxidizing the sulfur dioxid ($SO_2$) into sulfur trioxid, ($SO_3$). Thus, by the dissociation in the way indicated, of, of the hydrochloric acid, the chlorin is regularly returned into the principal process, and to the combining apparatus in the same proportionate or measured quantity in which it is withdrawn from the chamber M, and in which it is required in the chamber 4, so that the process itself, by its continuous operation, provides and re-uses, continually, the same circulating supply and quantity of the chlorin, without requiring renewal except to make up for any slight loss due to leakage or other accidental causes. And in a like manner, the hydrogen may be said to be dissociated from the chlorin and to be oxidized in said apparatus 20, so that the process itself, by its continuous operation provides continually the required current of hydrogen for first joining with oxygen in the apparatus 20; next for holding the hydrogen until reaching the chamber 4; and finally for there releasing the oxygen in a nascent state for oxidizing the sulfur dioxid, and releasing the hydrogen for re-combining with the chlorin. Thus the complete circuit has continuously present in all parts thereof, a quantity of chlorin accompanied by a quantity of hydrogen, and if we consider the hydrogen as a basic element, this may be regarded as shifting to a combination with chlorin in one part of the circuit, and to a combination with oxygen in another part of the circuit, and so on, in a continuous manner.

Furthermore, the air (N and O) supplied to the dissociation apparatus 20, in connection with hydrochloric material, furnishes,—in addition to the required oxygen for combining with the hydrogen,—a relatively large quantity of the nitrogen for diluting the materials flowing through said pipe 29, and for thereby through expansion and absorption of heat, modifying and controlling the temperature conditions not only in said conduit 29, but also subsequently thereto, during the principal process. These features in connection with the several reactions, result in a final completion of the acid-forming process in such a way as to largely balance the heat of reaction with that which disappears by the changes in the combining and dissociating actions, so that only a relatively small amount of surplus heat remains to be disposed of by means of the described cooling arrangements. Thus the complete process, by reason of the features here explained, involves a minimum cost for excess or waste heat, since it also provides for effecting the principal reactions under a moderate temperature instead of the high temperature which, otherwise, such a direct and intensive manufacture of the sulphuric acid might naturally produce.

By supplying to the circuit of the process a neutral gas,—as nitrogen or a mixed gas consisting mainly of nitrogen,—this gas serves as a diluent of, and also as a carrier-gas for the other materials, and coöperates therewith in several ways. By its diluent action, the carrier gas enlarges the total volume and accelerates the flow of the incorporated materials passing through the reaction zones of the circuit, and also by its expansion when heated, tends by the absorption of heat to favorably modify the temperature conditions throughout the process. These features of the neutral gas and of its modes of mechanical and physical action, also tend to reduce the otherwise normal violence of the principal reactions and to increase the time interval thereof. By suitably regulating the excess and proportionate quantity of the carrier gas, the actions and the reactions may be so modulated as to avoid any unduly destructive effects of the heat upon the apparatus.

In order to avoid making a dilute sulfuric acid, the quantity of water, $H_2O$, supplied by the pipe 8, must be restricted, of course, to the amount needed for supplying the required elements for the acid-forming reactions involved in the production of the fuming acid. When the steam-supply through the nozzle $n$ is only sufficient in quantity of $H_2O$ for that purpose, and if then a greater jet-action is desired, this may be obtained by using a higher steam pressure, and thereby secure a more intense mechanical agitation of the incorporated materials in the combining spaces 4 and G; also the dryness, or the superheat of the steam may be regulated or increased as found desirable.

The two coöperative carrier-streams,—in this instance comprising the chlorin and the hydrogen,—together constitute a two-substance oxygen-transferring current which operates in the process and under the conditions thereof, to take up one proportion of oxygen from a compound gas containing oxygen, and convey the same to the sulfur dioxid, and there yield up said oxygen in a nascent state directly to the sulfur for thereby converting the dioxid into the trioxid thereof. In these actions and reactions, as will now be evident, the sulfur dioxid and a carrier-gas are mixed with a gaseous compound comprising combined therein, oxygen gas and a non-oxygen gas, and said compound is dissociated for releasing the oxygen in nascent state or form, and this nascent oxygen is combined with the sulfur dioxid to make sulfur trioxid, and, simultaneously, said non-oxygen gas is combined with the carrier-gas, said reactions and dissociation being effected under the action of water which is in the form of a flowing current of expanding,—and preferably superheated,— steam of a quantity only sufficient for combining with a portion of the trioxid, whereby on condensation of the combined sulfur trioxid and water to liquid form the remaining portion of the trioxid is incorporated or dissolved therein. By increasing the quantity of water, however, the proportion of the uncombined trioxid may be reduced, and thus make the compound product a 100% acid, or a dilute acid.

Having thus described my invention, I claim:

1. A process of continuously re-using chlorin in the manufacture of a sulfur compound comprising sulfuric acid and sulfur trioxid, which consists in continuedly circulating in a multi-stage circuit, hydrogen and chlorin, incorporating the hydrogen and chlorin while combined as hydrochloric acid in a mixture with oxygen and a neutral gas each supplied to the circuit at one stage thereof in a continued stream, and heating this mixture to the point of dissociating the hydrogen from the chlorin and combining this hydrogen with the oxygen to form a water vapor; next in a further stage of the circuit, adding sulfur dioxid also supplied in a continued stream, and converting the sulfur dioxid into sulfur trioxid by dissociating said water vapor and combining the oxygen thereof with the sulfur dioxid while re-combining the said hydrogen thereof with the chlorin; and, simultaneously with this re-combining operation, incorporating the entire mixture with steam supplied in a quantity sufficient to convert only a portion of the sulfur trioxid into sulfuric acid.

2. A process of continuously re-using chlorin in the manufacture of sulfur compounds comprising sulfuric acid, which consists in continuedly circulating in a multi-stage circuit, hydrogen and chlorin, incorporating the hydrogen and chlorin while combined as hydrochloric acid in a mixture with oxygen and a neutral gas each supplied to the circuit at one stage thereof in a continued stream, and heating this mixture to the point of dissociating the hydrogen from the chlorin and combining this hydrogen with the oxygen to form a water vapor; next in a further stage of the circuit, adding sulfur dioxid and steam each supplied in a continued stream, and converting the sulfur dioxid into sulfur trioxid by dissociating said water vapor and combining the oxygen thereof with the sulfur dioxid while re-combining the said hydrogen thereof with the chlorin while the entire mixture is incorporated with the steam.

3. A process of continuously re-using chlorin in the manufacture of sulfur compounds comprising sulfuric acid, which consists in continuedly circulating in a circuit, hydrogen and chlorin, incorporating the hydrogen and chlorin while combined as hydrochloric acid in a mixture with an oxygen-yielding gas supplied to the circuit at one stage thereof in a continued stream, and heating this mixture to the point of dissociating the hydrogen from the chlorin and combining this hydrogen with the oxygen to form a water vapor; next in a further stage of the circuit, adding sulfur dioxid and steam each supplied in a continued stream and converting the sulfur dioxid into sulfur trioxid by dissociating said water vapor and combining the oxygen thereof with the sulfur dioxid and re-combining the said hydrogen thereof with the chlorin while the entire mixture is incorporated with the steam.

4. A process of continuously re-using chlorin in the manufacture of mixed sulfuric acid and sulfur trioxid, which consists in circulating hydrogen and chlorin continuously in a closed circuit having therein three process-stages, and at one stage in the circuit incorporating together in a heated stream the chlorin content and the hydrogen while combined with chlorin, with a neutral gas and with sulfur dioxid, intermingling said incorporated materials with expanding steam supplied to said heated stream in proportions for thereby forming sulfuric acid associated with sulfur trioxid and also forming hydrochloric acid gas, next at another said stage in the circuit, separating these products, and later, at a third stage in the circuit, continuously dissociating the hydrogen from the chlorin of the hydrochloric acid and then continuing the re-incorporating and re-combining the elements thereof in a continuous circuit and process in which the circuit-form stream comprising the chlorin in a given quantity passes through one process-stage of the closed circuit in which the chlorin is in combination with hydrogen, and passes through another stage of the circuit in a mixture with the same hydrogen while this is combined with oxygen, whereby the chlorin is supplied to the combining chamber in an uncombined form, and in the same quantity as existing in the said combined form thereof.

5. A process of continuously re-using chlorin in the manufacture of mixed sulfuric acid and sulfur trioxid, which consists in circulating hydrogen and chlorin in a closed circuit, and at one place in the circuit incorporating the uncombined hydrogen and chlorin with nitrogen and sulfur dioxid and also with water vapor and with expanding steam, supplied in proportions for thereby converting the sulfur dioxid into sulfuric acid associated with sulfur trioxid and also forming hydrochloric acid, next at another place in the circuit separating these products and later at a third place in the circuit subjecting the hydrochloric acid to dissociation, and then to re-incorporation and re-combination as before, in a continuous circuit and process in which the circuit-form stream comprising the chlorin in a given quantity passes through one part of the closed circuit in an acid combination with hydrogen, and through another part of the circuit in a mixture with the same hydrogen while this is combined with oxygen, and is thereby supplied uncombined to a combining chamber in the circuit, in the same proportions as existing in the said combined form thereof.

EDWIN D. CHAPLIN.

Witnesses:
H. D. PENNEY,
H. I. SIEGEL.